(12) United States Patent
Lin

(10) Patent No.: US 9,965,421 B2
(45) Date of Patent: May 8, 2018

(54) ELECTRONIC DEVICE COUPLING SYSTEM AND METHOD

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 474 days.

(21) Appl. No.: 14/684,868

(22) Filed: Apr. 13, 2015

(65) Prior Publication Data

US 2016/0188512 A1 Jun. 30, 2016

(30) Foreign Application Priority Data

Dec. 31, 2014 (CN) .......................... 2014 1 0852798

(51) Int. Cl.
| | |
|---|---|
| *G06F 13/00* | (2006.01) |
| *G06F 13/364* | (2006.01) |
| *G06F 13/42* | (2006.01) |
| *G06F 13/40* | (2006.01) |
| *H04L 12/40* | (2006.01) |
| *H04L 12/18* | (2006.01) |

(52) U.S. Cl.
CPC .......... *G06F 13/364* (2013.01); *G06F 13/404* (2013.01); *G06F 13/4282* (2013.01); *H04L 12/40117* (2013.01); *H04L 12/18* (2013.01)

(58) Field of Classification Search
None
See application file for complete search history.

(56) References Cited

U.S. PATENT DOCUMENTS

| | | | |
|---|---|---|---|
| 6,697,073 B1* | 2/2004 | Kadota | H04N 1/00204 345/501 |
| 6,745,281 B1* | 6/2004 | Saegusa | G06F 21/805 709/213 |
| 6,778,557 B1 | 8/2004 | Yuki et al. | |
| 8,995,981 B1* | 3/2015 | Aginsky | G08C 17/02 455/419 |
| 2005/0273531 A1* | 12/2005 | Domitrovich | G09G 5/003 710/62 |

(Continued)

FOREIGN PATENT DOCUMENTS

| | | |
|---|---|---|
| EP | 1876790 A1 | 1/2008 |
| TW | 201236491 | 9/2012 |

(Continued)

*Primary Examiner* — Henry Tsai
*Assistant Examiner* — Dean Phan
(74) *Attorney, Agent, or Firm* — ScienBiziP, P.C.

(57) ABSTRACT

An electronic device coupling system includes a master electronic device and a plurality of slave electronic devices. The master electronic device includes a connecting module. Each slave electronic device includes a coupling module. The connecting module includes a plurality of connecting ports. Each connecting port assembly has a plurality of group address codes corresponding to the slave devices and a plurality of matching codes corresponding to each connecting port and each group address code. The master device can be coupled to each slave device according to a group address code. The coupling ports are configured to couple to the connecting ports according to the matching codes. An electronic device coupling method is further provided.

16 Claims, 9 Drawing Sheets

(56) References Cited

U.S. PATENT DOCUMENTS

2006/0047908 A1* 3/2006 Chikusa ............... G06F 3/0613
                                                 711/114
2014/0201400 A1   7/2014 Beel et al.

FOREIGN PATENT DOCUMENTS

| TW | 201415937 | 4/2014 |
|----|-----------|--------|
| TW | 201433137 | 8/2014 |

* cited by examiner

ELECTRONIC DEVICE COUPLING SYSTEM AND METHOD

FIELD

The subject matter herein generally relates to data transmission coupling systems.

BACKGROUND

Electronic devices, such as electronic white boards, are always coupled to slave devices, such as mobile phones, universal serial buses (USBs), and so on. The slave devices are connected to the main electronic devices in parallel.

BRIEF DESCRIPTION OF THE DRAWINGS

Implementations of the present technology will now be described, by way of example only, with reference to the attached figures.

DETAILED DESCRIPTION

Figure 1:
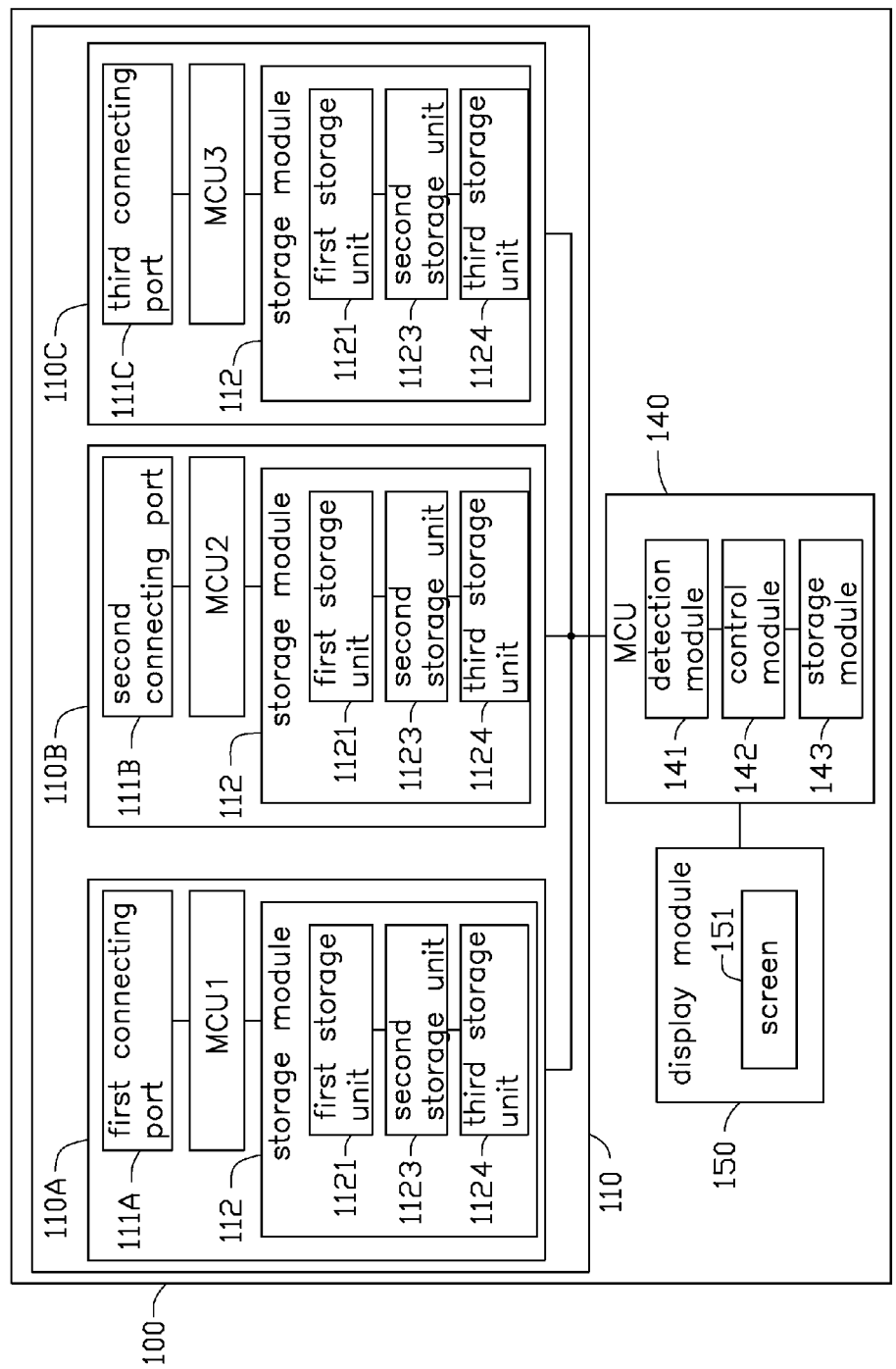
FIG. 1 is a block diagram of one embodiment of a master device of an electronic device coupling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
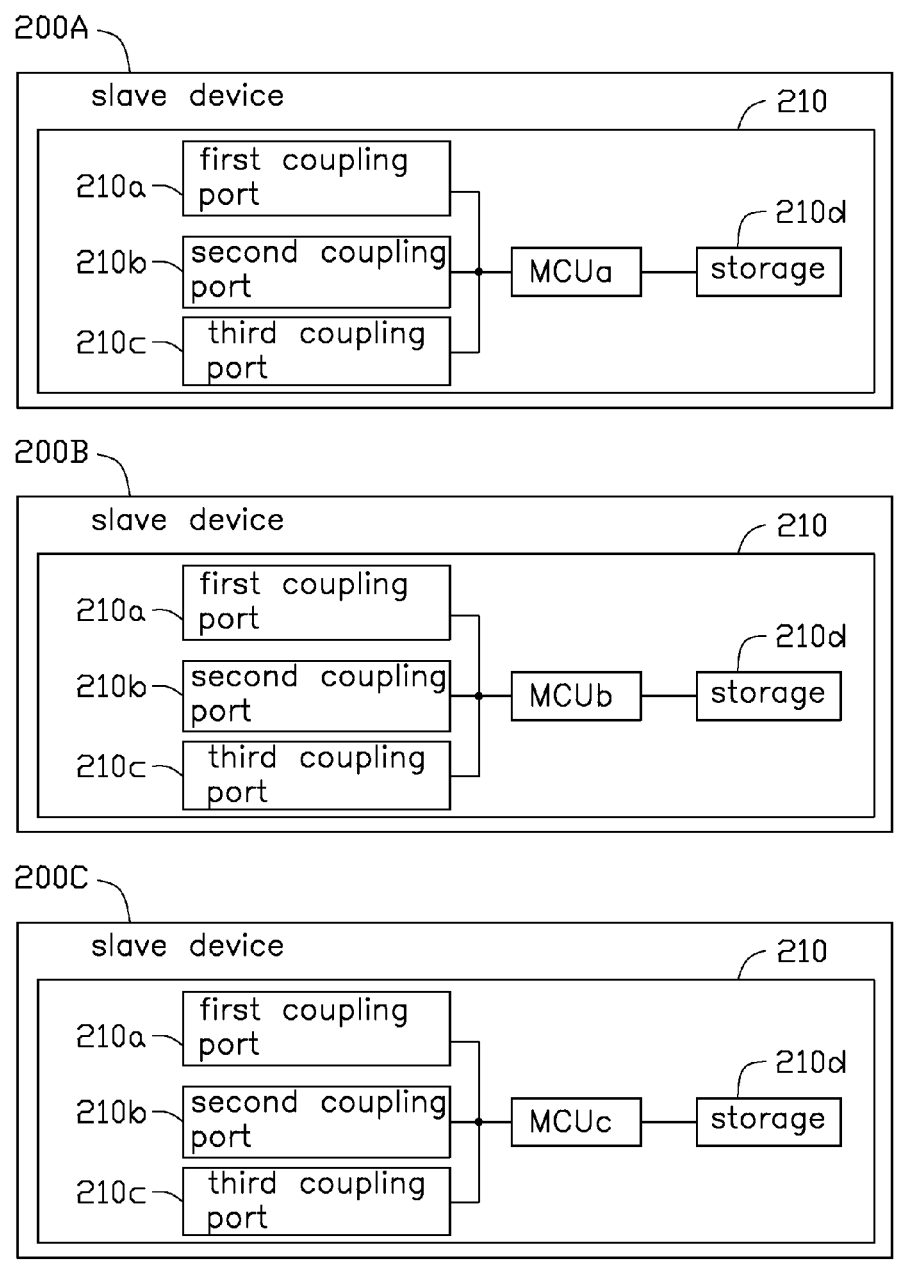
FIG. 2 is a block diagram of three example slave devices of the electronic device coupling system.
Figure 3:
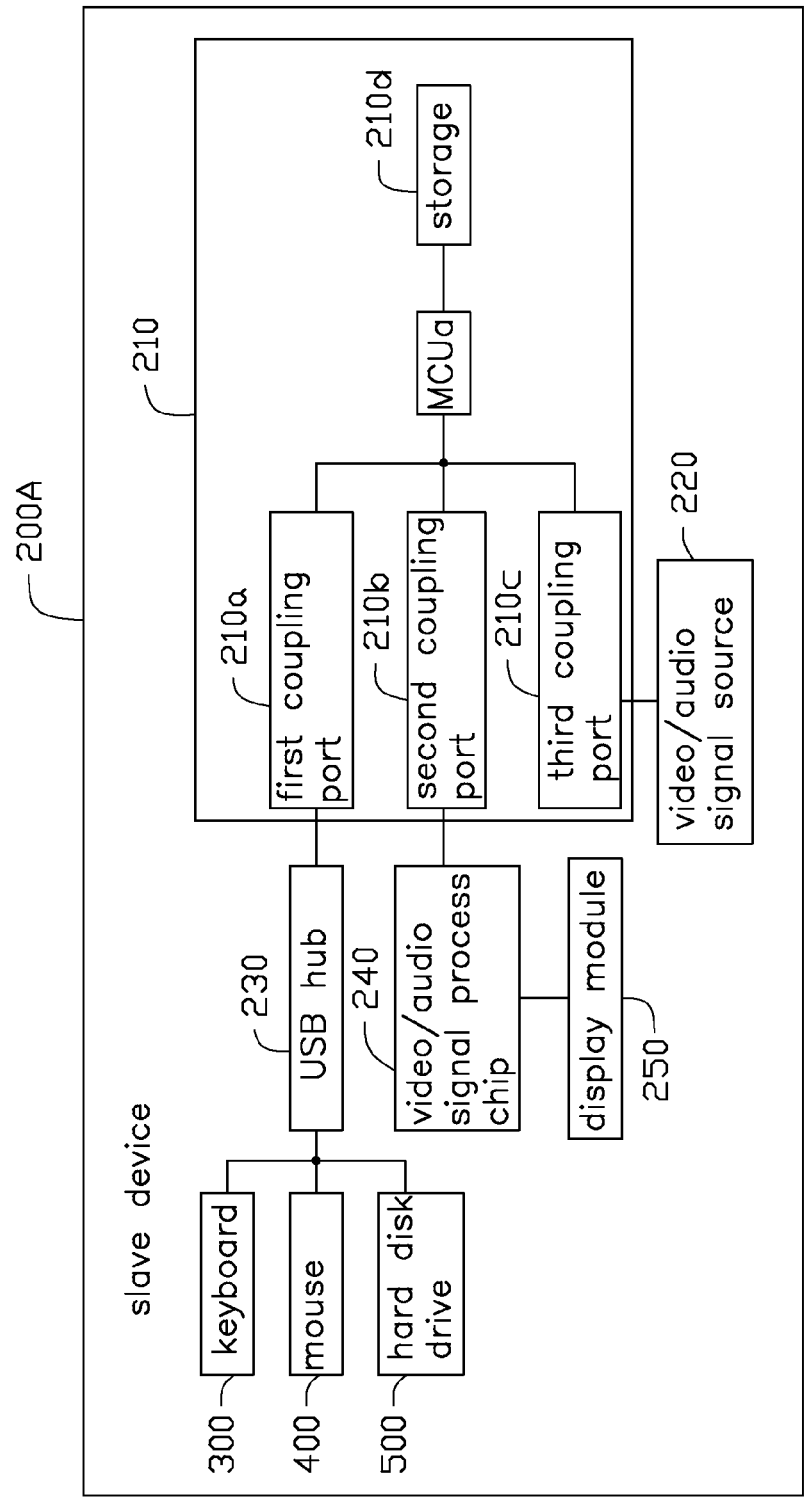
FIG. 3 is a block diagram of one of the three example slave devices of FIG. 2.

FIGS. 1-3 illustrate an electronic device coupling system in accordance with an embodiment. The electronic device coupling system can include a master device 100 and a plurality of slave devices 200A-200C. In at least one embodiment, the master device 100 can be a monitor, a television (TV), or a mobile phone, and the slave devices 200A-200C can be tablet computers, mobile phones, power supplies, hard disks, TVs, routers, and so on. The master device 100 can be coupled to the slave devices 200A-200C via a wireless method, such as BLUETOOTH, wireless fidelity (WIFI), and WIGIG, or via cables.

The master device 100 can include a connecting module 110, and the connecting module 110 can include a plurality of connecting port assemblies 110A-110C. The connecting port assembly 110A can include a first connecting port 111A. The connecting port assembly 110B can include a second connecting port 111B. The connecting port assembly 110C can include a third connecting port 111C.

Each slave device 200A, 200B, 200C can include a coupling module 210 which is couplable to the connecting module 110, and the coupling module 210 can include a first coupling port 210a, a second coupling port 210b, a third coupling port 210c, and a storage 210d. The first coupling port 210a is coupled to the first connecting port 111A. The second coupling port 210b is coupled to the second connecting port 111B. The third coupling port 210c is coupled to the third connecting port 111C.

The type of the first coupling port 210a is different from the second coupling port 210b and the third coupling port 210c, and the second coupling port 210b is different from the third coupling port 210c. The type of each first coupling port 210a is same as the type of the first connecting port 111A. The type of each second coupling port 210b is same as the type of the second connecting port 111B. The type of each third coupling port 210c is same as the type of the third connecting port 111C. In at least one embodiment, the type of the first coupling port 210a, the second coupling port 210b and the third coupling port 210c may be WIFI or BLUETOOTH (BT) or WIGIG.

Each of the connecting port assemblies 110A-110C is coupled to an MCU 140 of the master device 100 via a control bus. The control bus can be I2C bus or a UART bus or both. The MCU 140 can send control signals to the first coupling port 210a, the second coupling port 210b, and the third coupling port 210c of each slave device 200A~200C via the first connecting port 111A, the second connecting port 111B, and the third connecting port 111C. The slave devices 200A~200C have an MCUa, an MUCb, and an MCUc respectively. Each of the MCUa, the MUCb, and the MCUc can receive the control signals and perform function controls according to the control signals. The respective storages 210d of the slave devices 200A~200C can store system softwares, function control codes, group address codes, and port matching codes.

The connecting port assembly 110A further includes an MCU1 and a storage module 112. The connecting port assembly 110B further includes an MCU2 and a storage module 112. The connecting port assembly 110C further includes an MCU3 and a storage module 112. Each storage module 112 can include a first storage unit 1121, a second storage unit 1123, and a third storage unit 1124.

The first storage unit 1121 of the connecting port assembly 110A stores matching codes of the first coupling port(s) 210a and the first connecting port 111A. For example, if each of the slave devices 200A-200C are matched with the master device 100, the matching codes stored in the first storage unit 1121 of the connecting port assembly 110A are 200A210a-01, 200B210a-02, and 200C210a-03. The 01, 02, and 03 indicators are ground address codes of the slave devices 200A, 200B, and 200C respectively. The indicators 200A210a, 200B210a, and 200C210a are port codes.

The first storage unit 1121 of the connecting port assembly 110B stores matching codes of the second coupling port(s) 210b and the second connecting port 111B. For example, if the slave devices 200A-200C are matched with the master device 100, the matching codes stored in the first storage unit 1121 of the connecting port assembly 110B are 200A210b-01, 200B210b-02, and 200C210b-03. The 200A210b, 200B210b, and 200C210b are port codes.

The first storage unit 1121 of the connecting port assembly 110C stores matching codes of the third coupling port(s) 210c and the third connecting port 111C. For example, if the slave devices 200A-200C are matched with the master device 100, the matching codes stored in the first storage unit 1121 of the connecting port assembly 110C are 200A210c-01, 200B210c-02, and 200C210c-03. The 200A210c, 200B210c, and 200C210c are port codes.

The third storage unit 1124 of each of the connecting port assemblies 110A-110C stores function control softwares of the slave devices 200A-200C. The third storage unit 1124 has pre-stored function control software of each type of slave device, such as tablet computer, mobile phone, power supply, hard disk, TVs, router, radio and so on. The function control software can be volume control, channel adjustment, brightness adjustment, power on/off control, and so on. The ground address codes can couple together the function control software and the coupling module 210 to the connecting module 110. The master device 100 can control each coupled slave device 200A-200C through the function control software, such as volume adjustment, channel adjustment, brightness adjustment, power on/off the coupled slave device 200A-200C, and so on.

The function control software of the slave device 200A is FW1, the function control software of the slave device 200B is FW2, and the function control software of the slave device 200C is FW3. The software matching code of the slave device 200A is 1124FW1-01. The software matching code of the slave device 200B is 1124FW2-02. The software matching code of the slave device 200C is 1124FW3-03. If the slave device 200A is a TV, the function control software FW1 is volume adjustment, brightness adjustment, power on/off control, and channel adjustment, and software codes corresponding to the function control software FW1 is stored in the storage 210d of the slave device 200A. If the slave device 200B is a radio, the function control software FW2 is volume adjustment, power on/off control, and channel adjustment, and software codes corresponding to the function control software FW2 are stored in the storage 210d of the slave device 200B.

The second storage unit 1124 of each of the connecting port assemblies 110A-110C stores the group address codes (01, 02, and 03) of all the slave devices 200A-200C. The group address code 01 corresponds to the matching codes 200A210a-01, 200A210b-01, 200A210c-01, and 1124FW1-01. The group address code 02 corresponds to the matching codes 200B210a-02, 200B210b-02, 200B210c-02, and 1124FW2-02. The group address code 03 corresponds to the matching codes 200C210a-03, 200C210b-03, 200C210c-03, and 1124FW3-03.

The master device 100 further includes a display module 150 coupled to the MCU 140. The display module 150 includes a screen 151. The screen 151 has a multi-function & system all in one platform-selection (MAP-SEL) window 156 (shown as in FIG. 5). When the MAP-SEL window 156 is selected, the screen 151 displays all slave device symbols which are successfully matched to the master device 100, such as DV1-DV3 (shown as in FIG. 6). The slave device symbol DV1 corresponds to the group address code 01. The slave device symbol DV2 corresponds to the group address code 02. The slave device symbol DV3 corresponds to the group address code 03. A mapping form is stored in a storage module 143 of each of the MCU 140, MCU1, MCU2, MCU 3, and in each coupling module 210. The mapping form defines mapping relationships about each group address code, each slave device symbol, and each matching code.

When a detection module 141 of the MCU 140 detects that one of the slave device symbols DV1-DV3 is selected, taking DV1 as an example, a control module 142 of the MCU 140 searches for the group address code 01 from the mapping form and sends the group address code 01 to the MCU1-MCU3. When each of the MCU1-MCU3 receive the group address code 01, the MCU1 starts to couple the first connecting port 111A to the first coupling port 210a, the MCU2 starts to couple the second connecting port 111B to the second coupling port 210b, the MCU3 starts to couple the third connecting port 111C to the third coupling port 210c, and the software codes in the storage 210d are coupled to the function control software FW1-FW3.

In a second embodiment, in order to reduce power consumption, when the control module 142 searches for the group address code 01, the group address code 01 is sent out to only one of the MCU1-MCU3, such as MCU1, so that the connecting port assembly 110B and connecting port assembly 110C can be switched off when the slave devices 200A-200C or one of them are on standby. The type of the first connecting port 111A is WIFI, BLUETOOTH, or WIGIG. When the MCU1 receives the group address code 01, the MCU1 starts a connection between the first connecting port 111A and the first coupling port 210a and sends the group address code 01 to the MCU2 and MCU3. The MCU2 starts and puts the second connecting port 111B on standby. The MCU3 starts and puts the third connecting port 111C on standby. When the first coupling port 210a is coupled to the first connecting port 111A, the coupling module 210 finds the group address code 01, the matching codes 200A210a-01, 200A210b-01, 200A210c-01, and the software matching code 1124FW1-01. Connections are started between the second connecting port 111B and the second coupling port 210b, and between the third connecting port 111C and the third coupling port 210c. The software codes are coupled to the function control software FW1.

Figure 6:
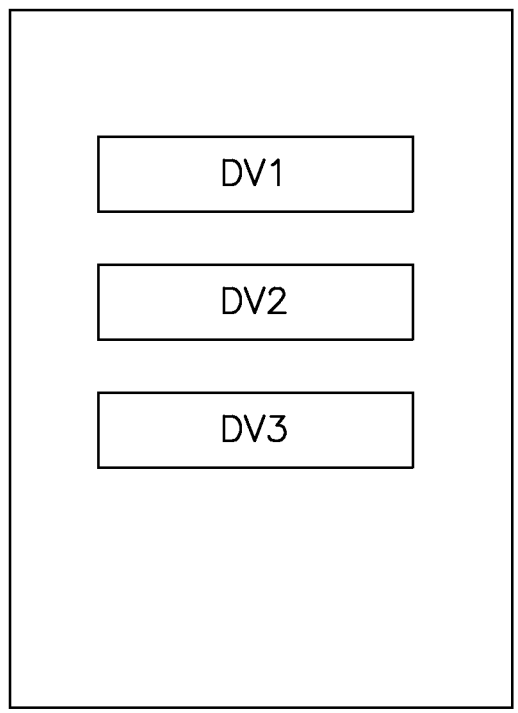
FIG. 6 shows a second window of the display of the master device of FIG. 1, showing symbols of each slave device matched to the master device.

FIG. 6 illustrates that when the master device 100 is coupled completely to the selected slave device, the screen 151 displays a function control window. If the selected slave device is a TV, the function control window is a TV function control window. If the selected slave device is a radio, the function control window is a radio function control window.

Each slave device can further include a video/audio signal source 220, a universal serial bus (USB) hub 230, a video/audio signal process chip 240, and a display module 250.

The video/audio signal source 220 is coupled to the third coupling port 210c and can capture an image/voice and send the image/voice data to the master device 100 through the third connecting port assembly 210C. The image/voice data can be from a camera or from the MCU 140. The master device 100 and the slave devices 200 can display the image and playback the voice.

The USB hub 230 is coupled to the first coupling port 210a, a keyboard 300, a mouse 400, and a hard disk drive 500. The keyboard 300 and the mouse 400 are taken as input devices and can control the master device 100 and each of the slave devices 200A-200C coupled to the master device 100 at the same time. In other embodiments, input device can be a touch pad. The hard disk drive 500 is taken as a storage device of each of the slave devices 200A-200C when each of the slave devices 200A-200C is coupled to the master device 100.

The video/audio signal process chip 240 is coupled to the second coupling port 210b and the display module 250 and configured to output video signals from the second connecting port 111B to the display module 250. The video/audio signal process chip 240 is further configured to output audio signals to an audio playback device with a wireless sound power amplifier (not shown).

Figure 4:
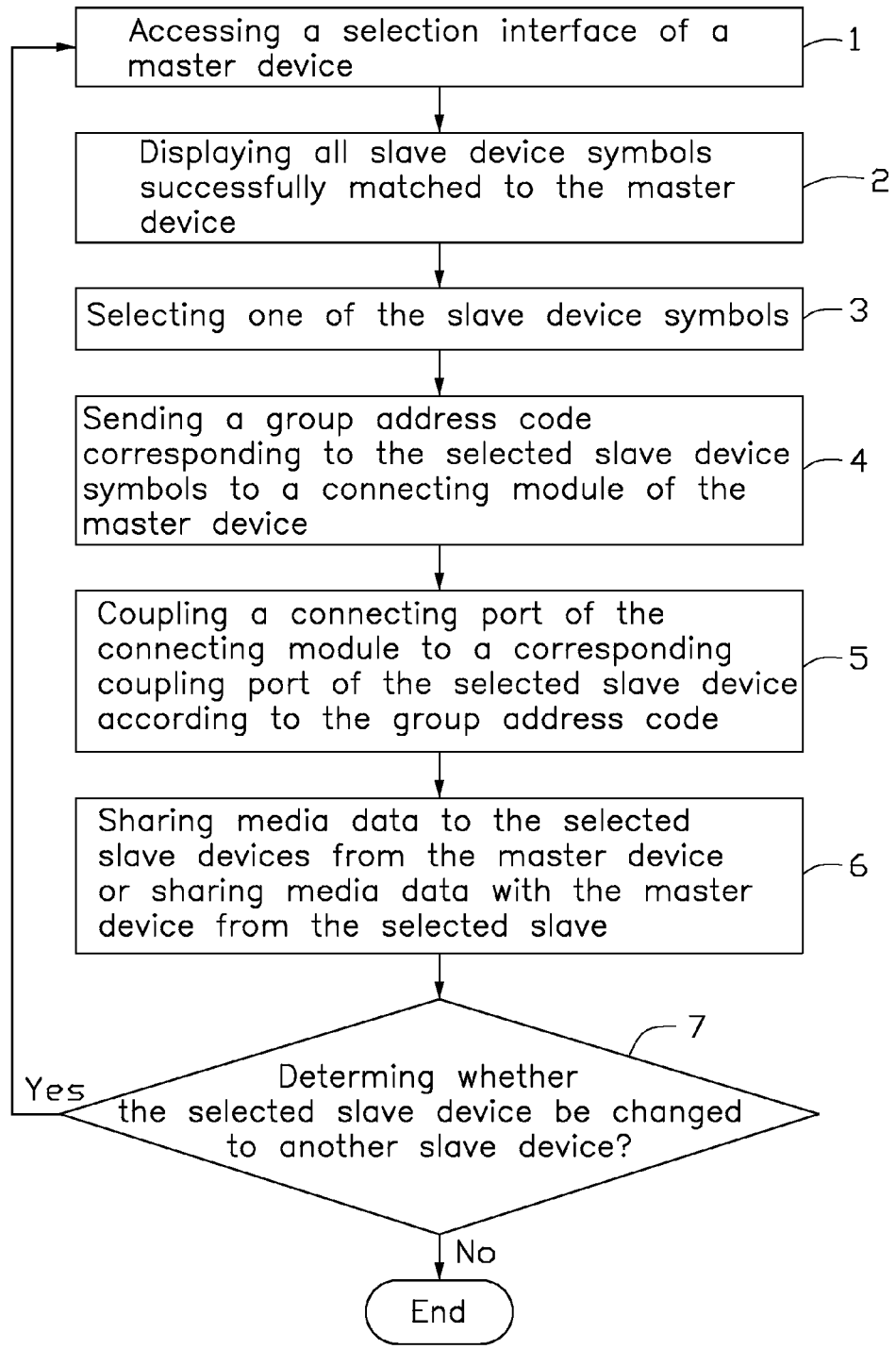
FIG. 4 is a flowchart of one embodiment of an electronic device coupling method.

Referring to FIG. 4, a flowchart is presented in accordance with an example embodiment of coupling method. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines, carried out in the example method. Furthermore, the illustrated order of blocks is illustrative only and the order of the blocks can change according to the present disclosure. Additional blocks can be added or fewer blocks may be utilized, without departing from this disclosure. The example method can begin at block 1.

Figure 5:
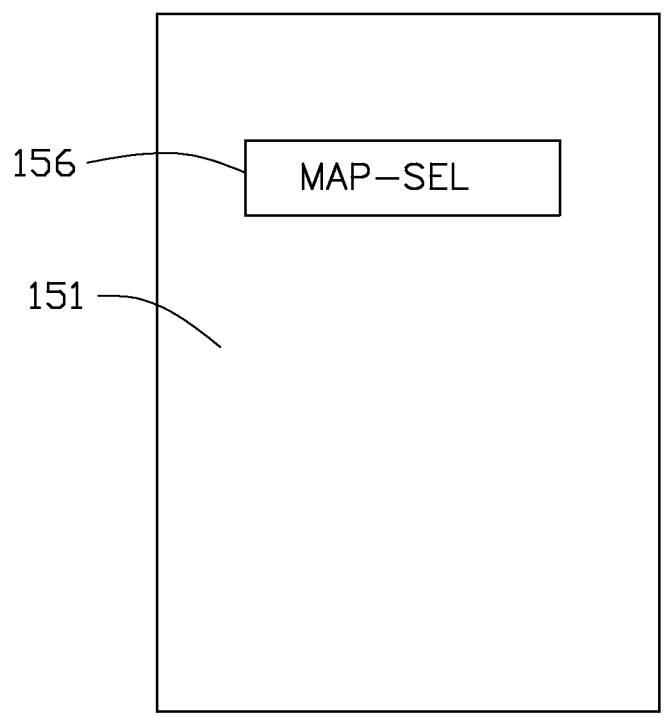
FIG. 5 shows a first window of a display of the master device of FIG. 1.

At block 1, accessing a selection interface of a master device 100 (shown in FIG. 5). User can touch the MAP-SEL window 156 in the screen 151 to access the selection interface.

At block 2, displaying all slave device symbols successfully matched to the master device 100 (shown as in FIG. 6).

At block 3, selecting one of the slave device symbols.

At block 4, sending a group address code corresponding to the selected slave device symbol to the connecting module 110 by the MCU 140.

At block 5, coupling each connecting port of the connecting module 110 to the corresponding coupling port of the selected slave device according to the group address code.

At block 6, sharing media data to the selected slave devices from the master device or sharing media data with the master device from the selected slave devices. The media data may be photos, videos, or pictures. In this position, the keyboard 300 and the mouse 400 can control the master device 100 directly.

Figure 7:
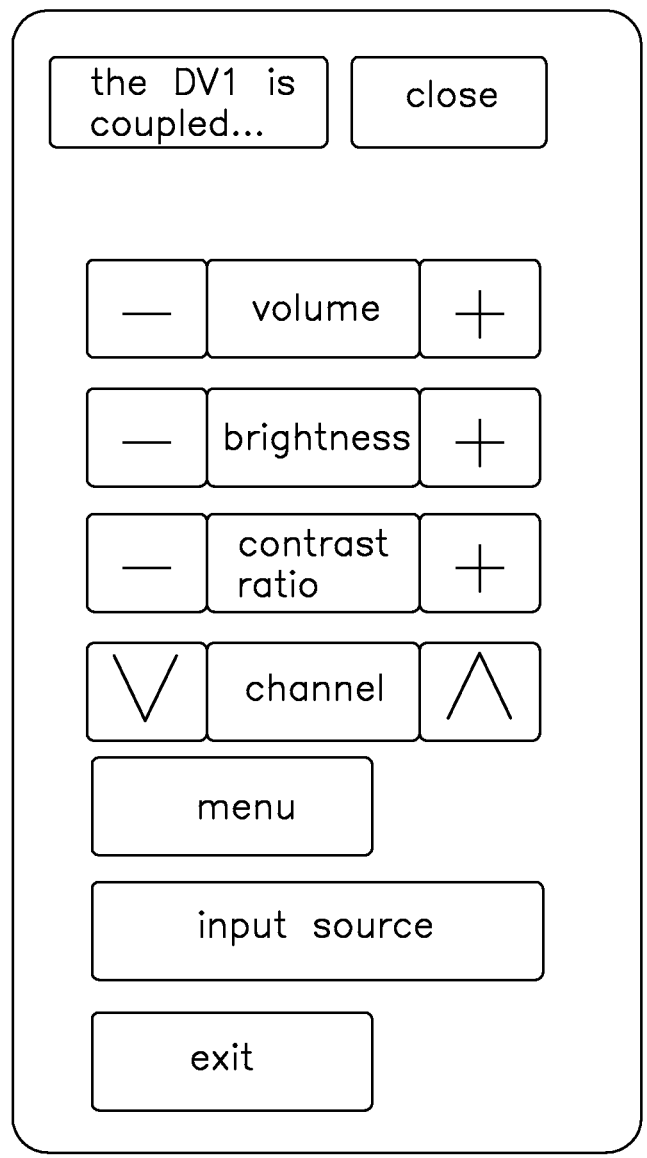
FIG. 7 shows a third window of the display of the master device of FIG. 1, after coupling the master device to a selected slave device.

Before block 1, a mapping form is stored in the storage module 143 of the MCU 140, in each connecting port assembly, and in each coupling module 210. The mapping form defines relationships about each group address code, each slave device symbol, each matching code, and each software matching code. Block 6 further includes displaying on the screen 151 a function control window (shown as in FIG. 7) corresponding to the selected slave device. The function control window can be selected by means of the mouse 400, the keyboard 400, to perform the function of the selected slave device.

Figure 8:
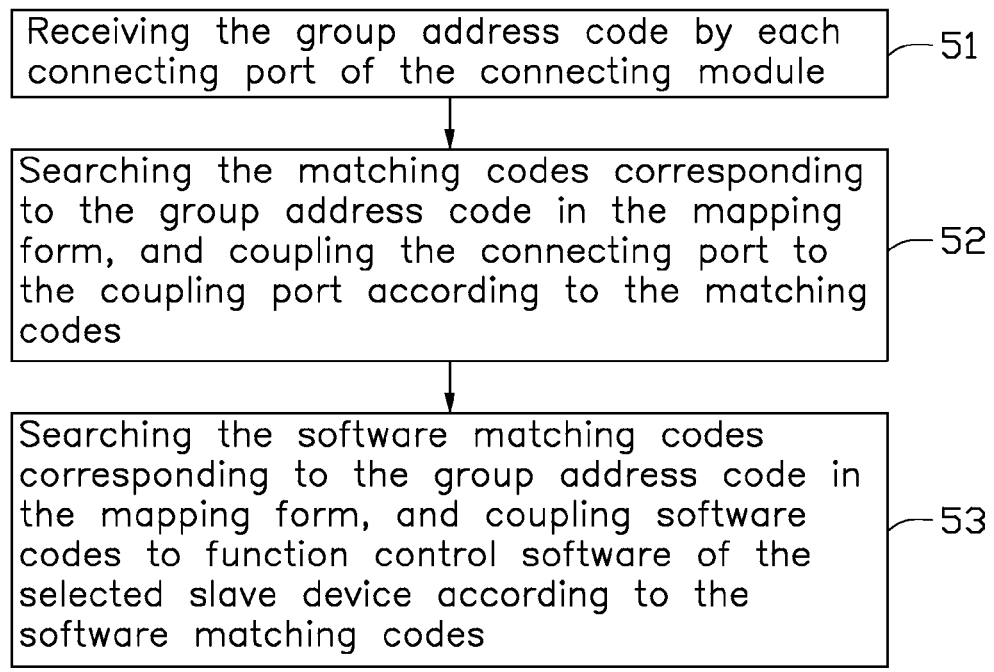
FIG. 8 is a flowchart of a first embodiment of a step S5 of the electronic device coupling method of FIG. 4.

Referring to FIG. 8, in at least one embodiment, block 5 can begin at block 51.

At block 51, receiving the group address code by each connecting port assembly of the connecting module 110.

At block 52, searching for the matching codes corresponding to the group address code in the mapping form, and coupling the connecting port of each connecting port assembly to the coupling port of the selected slave device, according to the matching codes.

At block 53, searching for the software matching codes corresponding to the group address code in the mapping form, and coupling the software codes to the function control softwares of the selected slave device, according to the software matching codes.

Figure 9:
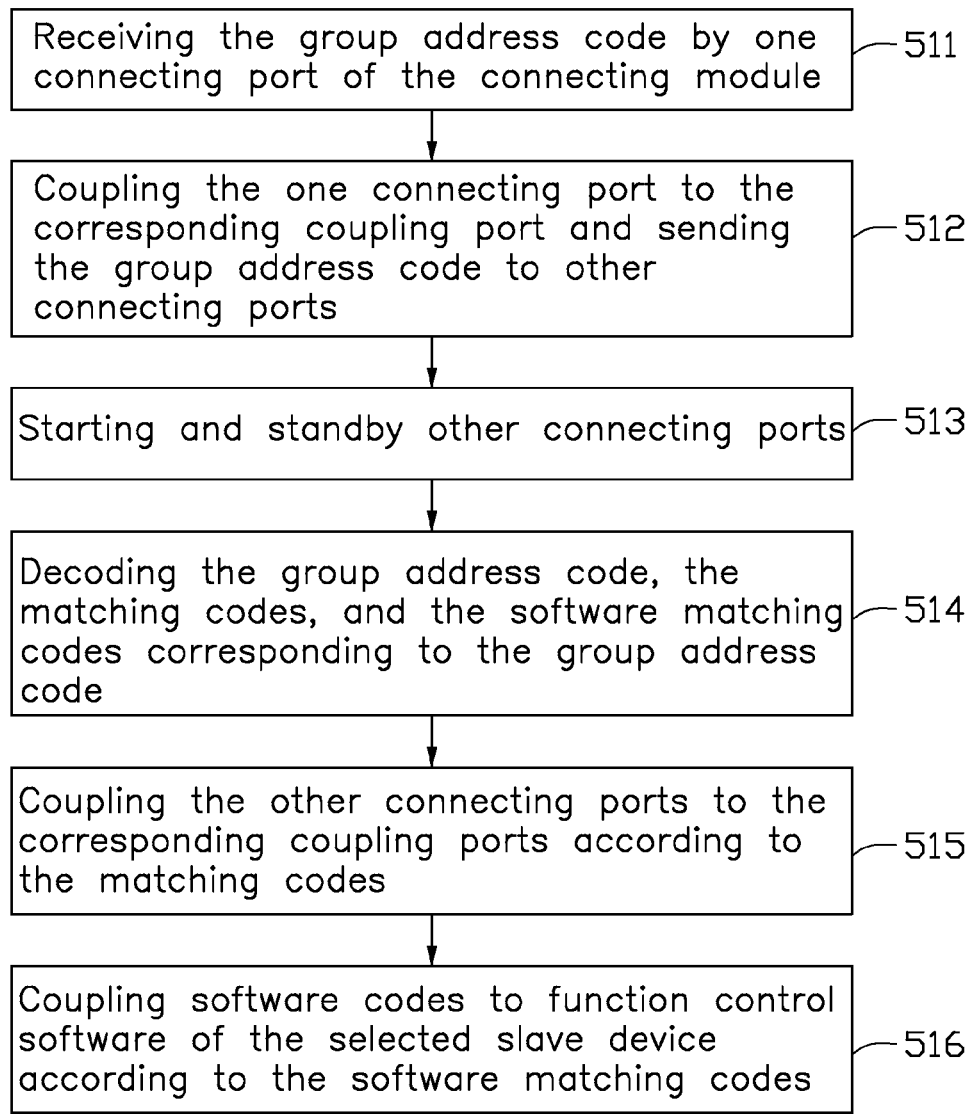
FIG. 9 is a flowchart of a second embodiment of the step S5 of the electronic device coupling method of FIG. 4.

Referring to FIG. 9, in another embodiment, the block 5 can begin at block 511.

At block 511, receiving the group address code by one of the connecting port assemblies of the connecting module 110.

At block 512, coupling the connecting port of one connecting port assemblies to the corresponding coupling port and sending the group address code to other connecting port assemblies.

At block 513, starting and putting on standby other connecting port assemblies.

At block 514, decoding the group address code, the matching codes, and the software matching codes corresponding to the group address code.

At block 515, coupling the connecting port of other connecting port assemblies to the corresponding coupling port, according to the matching codes.

At block 516, coupling the software codes to the function control software of the selected slave device according to the software matching codes.

The master device 100 can include a plurality of connecting modules. The connecting modules can have the same or different connecting port assemblies. The type of the connecting port assemblies can be HDMI, MHL, USB, DP, or SATA.

The embodiments shown and described above are only examples. Many details are often found in the art such as the other features of an electronic device coupling system and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device coupling system, the system comprising:
   a master device comprising a connecting module, the connecting module comprising a plurality of connecting port assemblies, and each connecting port assembly comprising a type of connecting port; and
   a plurality of slave devices coupled to the master device, each slave device comprising a coupling module, and the coupling module comprising a plurality of different types coupling ports;
   wherein each connecting port assembly has a plurality of group address codes corresponding to the plurality of slave devices and a plurality of matching codes; each of the plurality of matching codes corresponds to one of the connecting ports and one of the group address codes; the master device is couplable to each slave device according to a corresponding group address code; the coupling module is coupled to the connecting module; and the plurality of coupling ports are configured to couple to the connecting ports respectively according to the matching codes; and the master device further has a plurality of function control software according to the plurality of slave devices: each slave device has a plurality of software codes: and when the master device is coupled to the one slave device, the plurality of software codes are coupled to the plurality of function control software, and enable the software and hardware of the electronic device coupling system to be synchronously coupled to the one of the slave devices and the master device.

2. The electronic device coupling system of claim 1, wherein the type of each connecting port is same as the corresponding coupling port and is different from the connecting ports in each other connecting port assemblies.

3. The electronic device coupling system of claim 2, wherein the connecting port assemblies comprise a HDMI connecting port assembly, a MHL connecting port assembly, a USB connecting port assembly, or C BUS connecting port assembly.

4. The electronic device coupling system of claim 1, wherein each connecting port assembly further comprises a MCU coupled to the connecting port and a storage module coupled to the MCU, the storage module comprises a first storage unit and a second storage unit; the first storage unit stores the matching codes; and the second storage unit stores the group address code.

5. The electronic device coupling system of claim 4, wherein each connecting port assembly further has a plurality of software matching codes corresponding to each group address code, and the software codes is coupled to the function control software according to the software matching codes.

6. The electronic device coupling system of claim 5, wherein each storage module further comprises a third storage unit, and the third storage unit stores the software matching codes.

7. The electronic device coupling system of claim 4, wherein the MCU stores a mapping form, the mapping form defines mapping relationships about each group address code, each matching code, and each software matching code.

8. The electronic device coupling system of claim 1, wherein the master device further comprises a universal serial bus (USB) hub configured to couple to a first coupling port of the coupling module, an input device and a storage device are configured to couple to the USB hub.

9. The electronic device coupling system of claim 1, wherein the master device further comprises a video/audio signal source coupled to a third coupling port of the coupling module, and the video/audio signal source is configured to send video/audio signal to the one slave device.

10. The electronic device coupling system of claim 9, wherein the master device further comprises a video/audio signal process chip coupled to a second coupling port of the coupling module, and the video/audio signal process chip is configured to send video/audio signal from the one slave device to the master device.

11. The electronic device coupling system of claim 10, wherein the master device further comprises a display module coupled to the video/audio signal process chip and configured to display videos of the video signal from the video/audio signal process chip.

12. An electronic device coupling method comprising:
a setting step: storing a mapping form in a master device;
an access step: accessing a selection interface of the master device;
a display step: displaying all slave device symbols coupled to the master device;
a select step: selecting one of the slave device symbols;
a group address code sending step: sending a group address code corresponding to the selected slave device symbols to a connecting module of the master device;
a coupling step: coupling a connecting port of the connecting module to a corresponding coupling port of the selected slave device according to the group address code; and
a sharing step: sharing media data to the selected slave devices from the master device or sharing media data with the master device from the selected slave devices;
wherein the mapping form defines mapping relationships about each of group address codes, each slave device symbol, each slave device, each of a plurality of matching codes, and each of a plurality of software matching codes; the connecting port of the connecting module is coupled to the corresponding coupling port according to the plurality of matching codes; and
wherein the coupling step comprises below steps:
receiving the group address code by each connecting port of the connecting module;
searching the plurality of matching codes corresponding to the group address code in the mapping form, and coupling the connecting port to the coupling port according to the plurality of matching codes; and
searching the plurality of software matching codes corresponding to the group address code in the mapping form, and coupling software codes to function control software of the selected slave device according to the plurality of software matching codes.

13. The electronic device coupling method of claim 12, wherein the coupling step comprises below steps:
receiving the group address code by one connecting port of the connecting module; coupling the one connecting port to the corresponding coupling port and sending the group address code to other connecting ports; starting and standby other connecting ports;
decoding the group address code, the matching codes, and the software matching codes corresponding to the group address code;
coupling the other connecting ports to the corresponding coupling ports according to the matching codes; and
coupling software codes to function control software of the selected slave device according to the software matching codes.

14. An electronic device coupling method comprising:
a setting step: storing a mapping form in a master device;
an access step: accessing a selection interface of the master device;
a display step: displaying all slave device symbols coupled to the master device;
a select step: selecting one of the slave device symbols;
a group address code sending step: sending a group address code corresponding to
the selected slave device symbols to a connecting module of the master device;
a first coupling step: coupling a connecting port of the connecting module to a corresponding coupling port of the selected slave device according to the group address code;
a second coupling step: coupling a software code of the master device to a function control software of the selected slave device; and a sharing step: sharing media data to the selected slave devices from the master device or sharing media data with the master device from the selected slave devices;

wherein the mapping form defines mapping relationships about each of group address codes, each slave device symbol, each slave device, each of a plurality of matching codes, and each of a plurality of software matching codes; the connecting port of the connecting module is coupled to the corresponding coupling port according to the plurality of matching codes.

15. The electronic device coupling method of claim 14, wherein the coupling step comprises below steps:

receiving the group address code by each connecting port of the connecting module;

searching the matching codes corresponding to the group address code in the mapping form, and coupling the connecting port to the coupling port according to the matching codes; and searching the software matching codes corresponding to the group address code in the mapping form, and coupling software codes to function control software of the selected slave device according to the software matching codes.

16. The electronic device coupling method of claim 14, wherein the coupling step comprises below steps:

receiving the group address code by one connecting port of the connecting module;

coupling the one connecting port to the corresponding coupling port and sending the group address code to other connecting ports;

starting and standby other connecting ports;

decoding the group address code, the matching codes, and the software matching codes corresponding to the group address code;

coupling the other connecting ports to the corresponding coupling ports according to the matching codes; and coupling software codes to function control software of the selected slave device according to the software matching codes.

\* \* \* \* \*